Aug. 15, 1950     W. J. HIPP     2,518,782
POWER TRANSMISSION
Filed Nov. 8, 1946
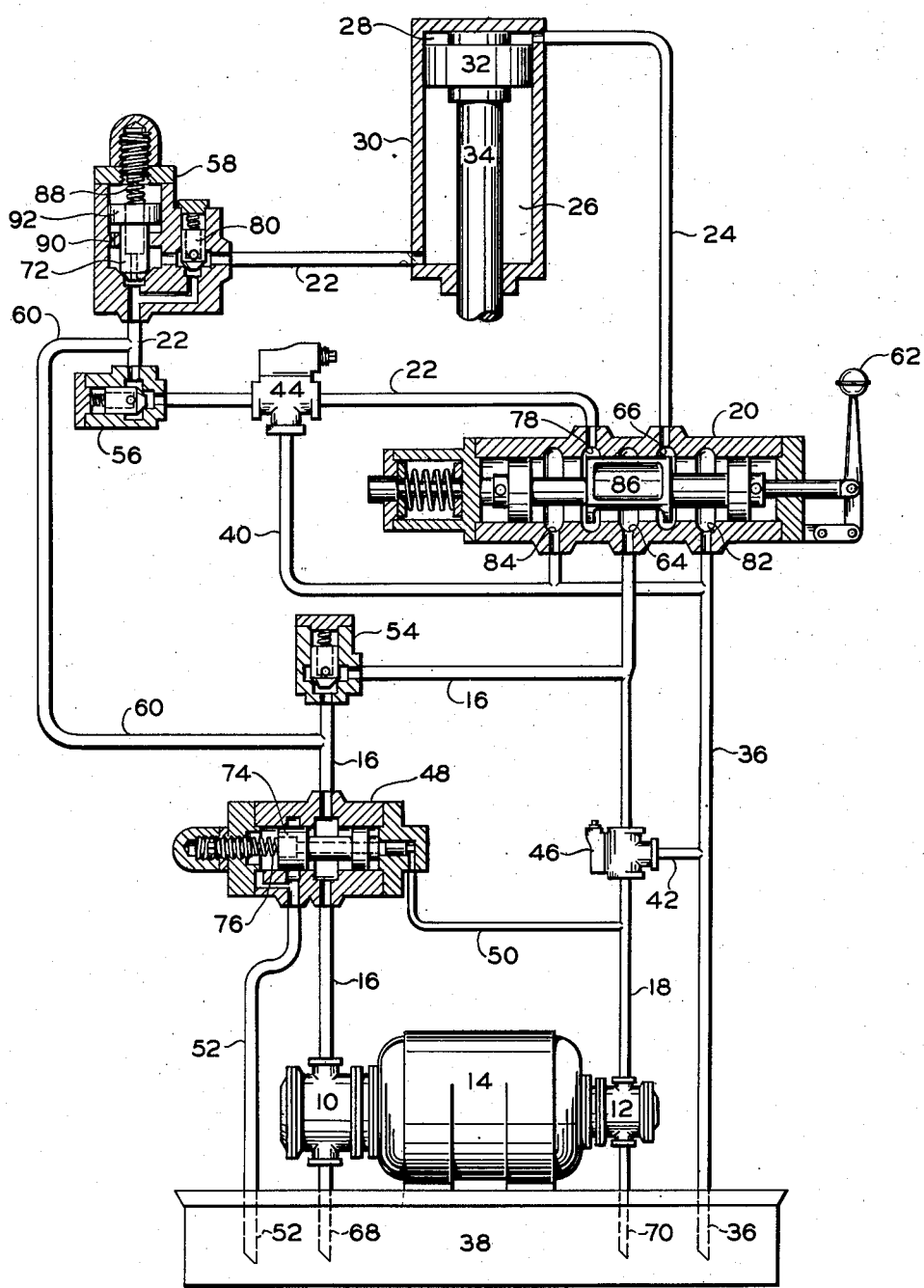
INVENTOR.
WILLIAM J. HIPP
BY Ralph L. Tweedale
ATTORNEY Patented Aug. 15, 1950

2,518,782

UNITED STATES PATENT OFFICE 2,518,782

POWER TRANSMISSION

William J. Hipp, Rochester, N. Y., assignor to Vickers Incorporated, Detroit, Mich., a corporation of Michigan Application November 8, 1946, Serial No. 708,508

6 Claims. (Cl. 60—52)

This invention relates to power transmissions, particularly to those of the type comprising two or more fluid pressure energy translating devices, one of which may function as a pump and another as a fluid motor.

More particularly, the invention relates to power transmissions employed for driving load devices operating at varying pressures and volumes. A flying shear is a typical example of such a load device. The cyclic operation of such a machine requires a rapid advance of the shear under no load to its point of contact of the shearing blade with the material. During the shearing operation, the blade must be operated by high pressure fluid but at a slow feed rate. When the shearing operation is complete, the transmission must return the blade rapidly to its original position for starting a new cycle.

Therefore, the general object of this invention is to provide a transmission adapted to automatically perform the functions described above.

In transmissions of this type it is advantageous to employ multiple pumps working in parallel to supply the required volume rather than resort to a single pump adequate for maximum volumetric demands. However, even though their maximum combined displacements may be required for rapid travel at no load, provision must be made to automatically unload one or more of the pumps when the work load increases requiring smaller volumes at higher pressures.

Another object of this invention is to provide means for automatically unloading a part of the multiple pumps during slow-speed, high pressure load demand.

By employing a hydraulic reciprocating motor of the differential piston type, the same rate of volumetric delivery to the rod end will cause the piston to travel faster than when the same delivery is directed to the large end. Consequently, by employing the large end for pressure feed operation and the smaller rod end for no load rapid return, the increase in travel rate is an inherent characteristic of the differential piston motor. However, if it is desired to have the motor or shear advance toward its load position at the same rate it returns, then additional volumetric capacity must be supplied. In the proposed invention, means have been provided for utilizing the discharge from the rod end of the motor to increase the fluid volume entering the large end of the motor.

Therefore, an object of this invention is to provide means for combining the discharge from the rod end of a differential piston motor with the total capacities of the multiple pumps and conduct them to the large end of the motor during no load operation.

It is, therefore, another object of the present invention to provide means for balancing or approximately equalizing the rates of travel of a differential piston motor in both directions when no load is imposed.

An object of the invention is to provide hydraulic means for stopping and holding the load device in any selected position.

Further objects and advantages of the present invention will be apparent from the following description, reference being had to the accompanying drawing wherein a preferred form of the present invention is clearly shown.

In the drawing:

The single figure is a diagrammatic view of a power transmission system incorporating a preferred form of the present invention.

The transmission includes two pumps 10 and 12 driven by a prime mover 14. The pump 10 is provided with a pressure delivery conduit 16 which is connected to a pressure delivery conduit 18 of the pump 12. The delivery conduit 18 is connected to a four-way valve 20. Motor conduits 22 and 24 hydraulically connect the four-way valve 20 to the rod end 26 and the large end 28, respectively, of the reciprocating differential piston motor 30 where the piston 32 is coupled through rod 34 to the work load (not shown). A tank conduit 36 connects the four-way valve 20 to tank 38 and relief conduits 40 and 42 connect relief valves 44 and 46 to tank through conduit 36.

An unloading valve 48 in the delivery conduit 16 of pump 10 is connected by pressure line 50 to the other delivery conduit 18 of pump 12 and to tank 38 by relief conduit 52. A check valve 54 is located in delivery conduit 16 of pump 10 beyond the unloading valve 48.

A check valve 56 and counterbalance valve 58 are provided in the motor conduit 22. A by-pass conduit 60 connects the motor conduit 22 at a point between the check valve 56 and counterbalance valve 58, and extends to the delivery conduit 16 of the pump 10 at a point between the unloading valve 48 and the check valve 54.

In operation, to start the motor 30 toward its feed stroke (downward in the illustration) the control lever 62 is moved to the right thereby placing inlet port 64 in communication with port 66, conduit 24, and the large end 28 of motor 30. Pumps 10 and 12 supplied by suction conduits 68 and 70, respectively, deliver operating pressure fluid through conduits 16 and 18 to inlet port 64 of the four-way valve 20.

As the piston 32 travels downward in the drawing, pressure fluid in rod end 26 of the motor is forced out through conduit 22 by piston valve 72 of valve 58, into conduit 60, through check valve 54 and conduits 16 and 18 to join the combined capacities of pumps 10 and 12. The check valve 56 prevents discharge pressure fluid from the rod end 26 of motor 30 from returning to four-way valve 20 and to tank 38 through port 84 of conduits 40 and 36. Since the piston area at the head end is greater than the area in the rod end, the transfer from the rod end 26 to the large end 28 is made possible. Therefore, it is evident that the three sources of volumetric pressure fluid are combined during the rapid advance of piston 32 to its load or work position.

As soon as the load is imposed, the operating pressure will increase and when the line pressure in conduit 18 and line 50 reaches a pre-determined amount, the unloading valve 48 will open and dump the delivery of pump 10 to tank 38 through conduit 52. At the same time, the discharge from the rod end 26 of the motor 30 will also be discharged through conduit 16 and unloading valve 48 to tank. The fluid delivery from pump 12 is prevented from being unloaded to tank 38 through the valve 48 because of the check valve 54 in the conduit 16 and is delivered to the motor 30 for providing the feed stroke of the latter.

At the end of the feed stroke, when the load is released, the pressure in pump delivery conduit 18 will drop and piston valve 74 of unloading valve 48 will be returned by spring 76 to the closed position as shown in the drawing thus connecting the delivery of pump 10 into the circuit.

By shifting the control lever 62 to the left, pressure fluid from the inlet port 64 of four-way valve 20 will enter port 78 and be conducted to the rod end 26 of motor 30 through conduit 22, relief valve 44, check valve 56, and check valve 80 of counter-balance valve 58. The discharge from the large end 28 of motor 30 is directed through conduit 24, port 66, port 82, conduit 36 to tank 38. If during this rapid return stroke, an obstruction or load is encountered, the pressure in pump conduit 18 will rise causing the unloading valve 48 to open.

By shifting the control lever 62 to its neutral position as illustrated in the drawing, the four-way valve spool 86 will be in open center position. In the open center position, with all lines connected to tank, the load device such as a flying shear would drop into the path of travel of the material. To prevent this, a counter-balance valve 58 has been provided which imposes a minimum pre-determined back pressure on the rod end 26 of piston 32 in proportion to the force of spring 88 on valve 72. The valve 72 is pressure opened through passage 90 against piston 92.

It will thus be seen that the present invention has provided a transmission for driving a flying shear or similar type of load device requiring delivery of small volumes at high pressure during loads but larger volumes at lower pressures for producing rapid travel during no load. This is accomplished by the use of multiple pumps connected to a differential piston type motor and including hydraulic pressure means for automatically employing all or unloading a part of the volumetric deliveries of the pumps, in combination with the interchange of the discharge from the rod end of the motor to the large end of the differential piston in proportion to the demands.

While the form of embodiment of the invention as herein disclosed constitutes a preferred form, it is to be understood that other forms might be adopted, all coming within the scope of the claims which follow.

What is claimed is as follows:

1. A control for a hydraulic transmission employing multiple pumps hydraulically connected in parallel to a reciprocating, differential piston motor comprising a conduit connecting the rod end of the differential piston motor to the large end for combining the volumes of the multiple pumps and of the discharge from the rod end of the motor when directing operating fluid to the large end of the motor during no load rapid advance operation, flow control means in the conduit for restricting the direction of flow from the rod end to the large end of the motor, pressure actuated means controlled by the operating pressure for diverting a portion of the multiple pump volume and the discharge from the rod end of the motor to tank when directing operating fluid to the large end of the motor during high pressure, low volume, feed operations, and means for combining the volumes of the multiple pumps and diverting the discharge from the large end of the motor to tank when directing operating fluid to the rod end of the motor during no load rapid return operations.

2. A hydraulic transmission for driving a differential motor coupled to a load device requiring a high pressure low speed feed, in combination with rapid advance and return strokes under no load, comprising two fixed displacement pumps driven by a prime mover, means for directing the combined capacities of both pumps to operate the motor during no load, rapid advance or rapid return, means for directing the discharge from the rod end of the motor to the large end of the differential piston during no load, rapid advance operation, and means responsive to operating pressure for unloading one of the pumps and diverting the discharge from the rod end of the differential piston motor to tank during high pressure, low speed feed operation.

3. A hydraulic transmission for driving a differential motor coupled to a load device requiring a high pressure low speed feed, in combination with rapid advance and return strokes under no load, comprising two fixed displacement pumps driven by a prime mover, conduits connecting the pumps to both ends of the motor through a four-way valve for selectively directing the combined capacities from both pumps to either end of the motor during no load, means for directing the discharge from the rod end of the motor to the large end of the differential piston during no load, rapid advance operation, and means responsive to operating pressure for unloading one of the pumps and diverting the discharge from the rod end of the differential piston motor to tank during high pressure, low speed feed operation.

4. A hydraulic transmission for driving a differential motor coupled to a load device requiring a high pressure low speed feed, in combination with rapid advance and return strokes under no load, comprising two fixed displacement pumps driven by a prime mover, means for directing the combined capacities of both pumps to operate the motor during no load, rapid advance or rapid return, a conduit provided with a check valve, connecting one end of the motor to the other end and adapted to permit the discharge from the rod end of the motor to enter the larger end during no load rapid advance operation, and means responsive to operating pressure for unloading one of the pumps and diverting the discharge from the rod end of the differential piston motor to tank during high pressure, low speed feed operation.

5. A hydraulic transmission for driving a differential motor coupled to a load device requiring a high pressure low speed feed, in combination with rapid advance and return strokes under no load, comprising two fixed displacement pumps driven by a prime mover, means for directing the combined capacities of both pumps to operate the motor during no load, rapid advance or rapid return, means for directing the discharge from the rod end of the motor to the large end of the differential piston during no load, rapid advance operation, and a pressure actuated unloading valve connected to one of the pumps and to the rod end of the differential piston motor and controlled by the motor operating pressure for unloading one of the pumps when a load is imposed on the motor during operation in either direction and for unloading the rod end of the motor during load.

6. A hydraulic transmission employing a differential piston type reciprocating motor and adapted to produce high pressure low volume operation under load and large volume, rapid travel in either direction when the load is removed comprising two pumps, means forming a common delivery conduit connecting separate delivery conduits of the pumps to a four-way valve, pressure and return motor conduits connecting the four-way valve to the rod end and large end, respectively, of the motor, a drain conduit connecting the four-way valve to tank, and a check valve in one of the separate pump delivery conduits in combination with a pressure actuated unloading valve between the check valve and one of the pumps, the unloading valve being controlled by pressure in the other separate pump delivery conduit for unloading one of the pumps and the check valve preventing the other pump from being unloaded through the unloading valve, and a second check valve in the rod end motor conduit for blocking return flow from the rod end of the motor to the four-way valve in combination with a by-pass conduit connecting the rod end motor conduit between the second check valve and motor to one of the separate pump delivery conduits between the unloading valve and the check valve.

WILLIAM J. HIPP.

REFERENCES CITED

The following references are of record in the file of this patent:

UNITED STATES PATENTS

| Number | Name | Date |
|---|---|---|
| 1,982,711 | Vickers | Dec. 4, 1934 |
| 1,990,052 | Sosa | Feb. 5, 1935 |
| 2,005,018 | West et al. | June 18, 1935 |
| 2,353,791 | Shartle | July 18, 1944 |
| 2,426,411 | Peterson et al. | Aug. 26, 1947 |